United States Patent [19]

Berkowitz et al.

[11] 4,425,367
[45] Jan. 10, 1984

[54] METHOD OF PRODUCING THERMALLY PROCESSED EGG PRODUCTS

[75] Inventors: Daniel Berkowitz, Wellesley; Alan B. Bennett, North Reading; John L. Secrist, Medfield, all of Mass.; Debra A. Milette, Oakland, R.I.

[73] Assignee: The United States of America as represented by the Secretary of the Army, Washington, D.C.

[21] Appl. No.: 419,109

[22] Filed: Sep. 16, 1982

[51] Int. Cl.$^3$ .............................................. A23L 1/32
[52] U.S. Cl. .................................... 426/89; 426/131; 426/305; 426/330.1; 426/614; 426/407
[58] Field of Search ............ 426/89, 131, 302, 330.1, 426/573, 658, 614, 407, 305

[56] References Cited

U.S. PATENT DOCUMENTS

| | | | |
|---|---|---|---|
| 2,052,028 | 8/1936 | Harris et al. | 426/614 |
| 3,023,104 | 2/1962 | Battista | 426/804 X |
| 3,207,609 | 9/1965 | Gorman et al. | 426/614 |
| 3,475,180 | 10/1969 | Jones | 426/614 |
| 3,565,638 | 2/1971 | Ziegler et al. | 426/614 |
| 3,769,404 | 10/1973 | Latham et al. | 426/614 |
| 3,911,144 | 10/1975 | Strong et al. | 426/614 X |

Primary Examiner—Robert A. Yoncoskie
Attorney, Agent, or Firm—Robert P. Gibson; Anthony T. Lane; Mark Goldberg

[57] ABSTRACT

A method for producing a thermally processed, shelf-stable, egg product which comprises adding a small amount of microcrystalline cellulose to raw eggs, preparing omelets and scrambled eggs, packing the cooked egg product in containers and heating the eggs sufficiently to sterilize the contents. This particular treatment results in an egg product with good textural and taste qualities.

10 Claims, No Drawings

METHOD OF PRODUCING THERMALLY PROCESSED EGG PRODUCTS

The invention described herein may be manufactured, used, and licensed by or for the Government for governmental purposes without the payment to us of any royalty thereon.

BACKGROUND OF THE INVENTION (1) Field of the Invention

This invention relates in general to the production of thermally processed, shelf-stable egg products which are texturally acceptable.

(2) Description of the Prior Art

Heretofore, there has not been a thermally processed, shelf-stable, egg product which has retained satisfactory textural quality. There are several problems associated with subjecting eggs to the high heat necessary to sterilize in order to produce a shelf-stable product which are not encountered when one cooks eggs for immediate consumption. The most serious difficulty is that a heat process sufficient to sterilize will cause the egg product to become rubbery and to harden undesirably. Syneresis or weeping is also encountered with prolonged heating. A third difficulty is that the sulphur in the egg white reacts with the iron in the egg yolk to produce ferric sulfide, causing the eggs to develop a green color. Further, scrambled egg products tend to solidify into one solid mass during the sterilization process in the absence of a means to prevent solidification.

The problem of syneresis has been encountered in the production of frozen egg products as well as in cooked egg products. In U.S. Pat. No. 3,565,638, it was recognized that scrambled eggs prepared from thawed frozen whole eggs would "weep" due to syneresis when kept at serving temperature on a hot plate. It is known that syneresis results when the three-dimensional egg albumen gel structure formed upon application of heat, retrogrades to a more orderly, partially crystalline, state. Milk solids and edible starches have been used to decrease syneresis. Vegetable gum has also been used to increase the viscosity of the egg mixture. The production of green color has been prevented by use of disodium or calcium disodium ethylenediamine-tetraacetate (EDTA) and by acidification of egg compositions with an edible acid or acid salt to a pH below 7.1. Another method of improving the color of cooked egg products is disclosed in U.S. Pat. No. 3,598,612. In that invention, the egg yolks and whites are separated, the yolks treated with an edible oxidizing agent and then the yolk is surrounded by egg white and further processed.

SUMMARY OF THE INVENTION

This invention relates to a method for producing a thermally processed, shelf or storage-stable egg product selected from the group consisting of scrambled eggs and omelets wherein microcrystalline cellulose is added to the raw egg mixture before cooking and sterilization to prevent the formation of a rubbery product. The microcrystalline cellulose is dispersed in water and added to the raw egg mixture which is cooked and then inserted in a container which is then sealed and then thermally sterilized. In the case of scrambled eggs, an edible encapsulation mixture is added to the scrambled eggs to prevent the formation of a solid mass during thermal sterilization. To prevent discoloration, as a result of exposure to thermal stabilization temperatures, the amount of egg white in the mixture is reduced by 20% from that found in whole eggs and ascorbic acid is added as an antioxidant.

DETAILED DESCRIPTION

An object of this invention is to provide thermally processed, shelf-stable egg products which retain satisfactory taste, textural and visual qualities.

Another object of the invention is to provide thermally processed, shelf-stable, egg products which are suitable for packaging and use in one-half steam table size cans.

Microcrystalline cellulose, when added to preparations of egg products, in accordance with our invention eliminates rubberiness which has been the main obstacle encountered in attempts to produce a satisfactory thermally processed egg product. The microcrystalline cellulose has the further advantage of not imparting any undesirable features to the egg product. Other additives such as oil and starch mixtures are known to produce a product with appropriate texture but an inappropriate brown color. The microcrystalline cellulose does add a small amount of fiber to the diet which is a desirable feature for rations which are typically low in bulk.

The microcrystalline cellulose used in the examples herein is a product of FMC Corporation, known under the tradenames of Avicel RC-591 and RC-611. RC-591 is a white, water dispersible powder, particle size is such that less than 0.1% is retained on a 60 mesh screen, and is known to be made up of 89 parts microcrystalline cellulose and 11 parts sodium carboxymethylcellulose. RC-611 is made up of 85 parts microcrystalline cellulose and 15 parts sodium carboxymethylcellulose. Microcrystalline cellulose is listed in the *Fourth Supplement to the Food Chemicals Codex*, First Edition, by the National Academy of Sciences—National Research Council as: Cellulose, Microcrystalline (cellulose gel). A small amount of microcrystalline cellulose in the range of from about 0.5% to about 2.0% based on the weight of the egg mixture is effective; however, we have found that 1.0% to 1.25% of microcrystalline produces the optimum egg product.

Omelets and scrambled eggs were prepared by conventional culinary methods. While our particular compositions are set forth herein for scrambled eggs and for omelets, it is recognized that other compositions and ingredients known for this purpose are also contemplated. It is understood that the term "thermal processing" as used herein refers to thermal or heat sterilization sufficient to produce a shelf- or storage-stable product.

EXAMPLE 1

In preparing omelets, the following formulation was used:

| Ingredients | % by Weight |
| --- | --- |
| Whole egg | 74.40 |
| Egg yolk | 5.00 |
| Water | 17.70 |
| Microcrystalline cellulose (Avicel RC-591) | 1.25 |
| Corn oil | 1.00 |
| Salt | 0.50 |
| White pepper | 0.05 |
| Citric acid | 0.05 |
| Ascorbic acid | 0.05 |

Microcrystalline cellulose was completely dispersed in the water. The other ingredients were then slowly added to the water-microcrystalline cellulose mixture and thoroughly mixed together. Omelets were prepared by filling a length of flexible tubing with the egg mixture and then cooking the filled tubing until the eggs had an omelet appearance and texture. The omelets were removed from the tubing, sliced and inserted into metal cans which were then hermetically sealed. The canned product was placed in a retort in water and heated for about 60 minutes after the water had reached 240° F. Once the heating in the retort was completed, the cans were removed from the retort. The cans used in this example were one-half steam table size cans.

EXAMPLE 2

A similar procedure to that described in Example 1 was used to prepare a scrambled egg product. The same formulation may be used. Scrambled eggs were prepared by two different methods. In the first embodiment, the egg mixture was poured into flexible tubing and the filled tubing was cooked until the eggs had the desired appearance and texture. The cooked egg product was then broken up into a scrambled egg form before being packed into cans. In the second embodiment, the eggs were cooked in a steam jacketed kettle equipped with a continuous stirrer until they reached the desired appearance and texture. Prior to the eggs being packed in cans an edible encapsulation mixture of 4% corn starch, 20% margarine and 0.1% xanthum gum in water to 100% was prepared. The encapsulation mixture was heated separately for a sufficient amount of time for it to assume a gel-like consistency before being added to the egg mixture. This edible mixture was added to the scrambled eggs in an amount of from 5% to 10% by weight based on the weight of the scrambled eggs, coating the scrambled eggs and preventing them from forming a single solid mass during the thermal processing. The scrambled eggs and encapsulation mixture were placed in one-half size steam table cans and hermetically sealed, the cans were placed in water in a retort. The filled and sealed cans were heated at 240° F. for 60 minutes after the water in the retort had reached that temperature.

Numerous modifications may be made to this invention. These include the use of various starches such as, but not limited to, tapioca, corn, rice, potato and manioc. Such oils and fats as corn, soybean, peanut, cotton seed, palm and olive may be used as well as margarine and plant and animal fats. Various thickeners such as, but not limited to, tragacanth, xanthum, locust bean and cellulose derivatives may be used.

In all the embodiments of this invention, various seasonings such as salt, spices and herbs may be used. Various fish and meat products, both fresh, dehydrated, cured and canned may be used. Various sauces, gravies, or other liquids may be added to the product. Also, various fruit and vegetable products, fresh, dehydrated and canned may be used.

To prevent the discoloration of the sterilized egg product in accordance with this invention, we have found that removal of about 20% by weight of the egg white from the raw egg mixture and the addition of 0.05% by weight of ascorbic acid inhibits the formation of ferric sulfide and the resulting discoloration. Instead of removing egg white from the mixture, we can alternatively add egg yolk to the composition until the amount of egg white is 20% less than found in a whole raw egg mixture.

While specific examples have been disclosed, it is understood that any egg omelet or scrambled egg composition is within the scope of this invention and that any microcrystalline cellulose powder material that may be dispersed in water may be used herein.

We claim:

1. A method of producing thermally processed, shelf-stable, egg products selected from the group consisting of scrambled eggs and omelets which are texturally acceptable which comprises in sequence the steps of:
    (a) Forming a dispersion of water and microcrystalline cellulose, said microcrystalline cellulose present in amounts effective to eliminate rubberiness;
    (b) Blending the dispersion of water and microcrystalline cellulose with an egg product mixture consisting substantially of raw eggs;
    (c) Cooking the resulting mixture of step (b) to form an egg product;
    (d) Packing the egg product in a container;
    (e) Hermetically sealing the container containing the egg product; and
    (f) Heating the hermetically sealed container for sufficient time to sterilize the contents.

2. The method as recited in claim 1, wherein the heating step is carried out at a temperature in the range of about 212° F. to about 250° F.

3. The method as recited in claim 2, wherein the temperature is about 240° F.

4. The method as recited in claim 1, in which the egg white content of the raw egg mixture is reduced by 20% from that normally present in whole eggs before the raw egg mixture is added to the water microcrystalline cellulose dispersion.

5. The method as recited in claim 1 wherein the amount of microcrystalline cellulose in the egg mixture is from about 0.5% to about 2.0% by weight of the egg product mixture.

6. The method as recited in claim 5 wherein the amount of microcrystalline cellulose is about 1.0% to about 1.25% by weight.

7. The method as recited in claim 1, in which the scrambled eggs are coated with a gel-like edible encapsulation solution being the scrambled eggs are packed in the container, said encapsulation solution present in amounts effective to prevent the formation of a solid mass during the heating area.

8. The method as recited in claim 7 in which the encapsulation solution consists of about 4% corn starch, about 20% margarine and about 0.1% xanthum gum in sufficient water to total 100%, said encapsulation solution having been cooked to a gel-like consistency before being added to the scrambled eggs and being present in combination with said scrambled eggs in an amount from 5% to 10% by weight based on the weight of said scrambled eggs.

9. The product prepared by the method of claim 6.

10. The product prepared by the method of claim 8.

* * * * *